United States Patent [19]
Steiner

[11] Patent Number: 4,985,996
[45] Date of Patent: Jan. 22, 1991

[54] WIRE STRIPPER WITH V-NOTCH BLADE

[75] Inventor: Richard A. Steiner, East Haddam, Conn.

[73] Assignee: Rostra Tool Company, Branford, Conn.

[21] Appl. No.: 398,579

[22] Filed: Aug. 25, 1989

[51] Int. Cl.$^5$ .............. B21F 13/00; B26B 27/00; H02G 1/12
[52] U.S. Cl. .................. 30/90.1; 30/90.6; 81/9.4
[58] Field of Search .......... 30/90.1, 90.2, 90.3, 30/90.6, 90.7, 90.8; 81/9.4

[56] References Cited

U.S. PATENT DOCUMENTS

| | | | |
|---|---|---|---|
| 3,403,441 | 10/1968 | Eubanks | 30/90.1 |
| 4,117,749 | 10/1978 | Economu | 30/90.6 |
| 4,526,068 | 7/1985 | Undin et al. | 30/90.1 |
| 4,611,511 | 9/1986 | Mykkanen | 30/90.6 |
| 4,730,391 | 3/1988 | Wood | 81/914 |
| 4,766,672 | 8/1988 | Undin et al. | 81/9.4 |

FOREIGN PATENT DOCUMENTS 2548901 10/1976 Fed. Rep. of Germany ......... 81/9.4

Primary Examiner—Douglas D. Watts
Assistant Examiner—Paul M. Heyrana, Sr.
Attorney, Agent, or Firm—John H. Crozier

[57] ABSTRACT

A wire stripper blade for cutting to the center conductor of a coaxial cable, the blade having a V-notch in the cirmcumferential periphery thereof. When the wire stripper is rotated about the cable, the corners of the V-notch cut through and sever the braid sheath and inner insulation layer of the cable, while the center conductor remains within a circle defined by the corners of the V-notch, which circle is spaced apart from and concentric with the center conductor. The use of a V-notch eliminates dragging of the braid and the possibility of one or more wire strands thereof wrapping around the center conductor. It also eliminates nicking of the center conductor which can cause poor transmission signals.

3 Claims, 1 Drawing Sheet

WIRE STRIPPER WITH V-NOTCH BLADE

BACKGROUND OF THE INVENTION

1. Field of the Invention.

This invention relates to wire strippers generally and, more particularly, to a novel blade for wire strippers which includes a V-notch useful when a wire stripper is used for stripping coaxial cable.

2. Background Art.

Wire strippers are well known devices for removing insulation from wire or cable. One such stripper is described in U.S. Pat. No. 4,805,302, issued Feb. 21, 1989, and assigned to the assignee of the present invention, the entire disclosure of which patent is hereby made a part hereof by reference. A preferred embodiment of the disclosure of that patent is directed to a wire stripper having one or more rotatable and/or fixed circular cutting blades; although, the present invention is not limited to circular cutting blades and may be employed, as well, with wire cutters having straight cutting blades.

Wire strippers for coaxial cable typically employ two cutting blades which are rotated about the cable, one of which blades cuts through and severs an outer layer of insulation and the other of which blades cuts through and severs a braided or foil sheath and an inner layer of insulation which surrounds a centrally disposed conductor. The blades are limited in amount of radial motion relative to the central axis of the cable, with the intention that they cut through and sever only that which they are intended to cut through and sever. It is particularly important that the center conductor not be cut or nicked during the stripping operation. A problem has developed in that the dimensional tolerances of the jacket diameter vary, thus permitting differences in cut depth. Strippers, therefore, tend to cut or nick the center conductors of cables having the smaller jacket diameters within the tolerance range.

To avoid the above problem, stripping blades have been developed which include a square notch, with the corners of the square notch cutting through the braid sheath and the inner layer of insulation, while the center conductor remains within a circle spaced from and concentric with the center conductor without the center conductor being cut or nicked, the circle being defined by the rotating corners of the square notch. While the square notch avoids damage to the center conductor, such known stripping blades with square notches have a substantial disadvantage in that the square corners of the notch tend to "drag" the braid sheath and one or more of the fine wire strands comprising the braid may become wrapped around the center connector. Often, this wrapping is unnoticed by the technician stripping the cable to make a connection and the result may be that an end connector is placed on the cable with a built-in short-circuit.

Accordingly, it is a principal object of the present invention to provide a blade for wire strippers which overcomes the disadvantages of conventional square-notch-blade wire strippers.

Other objects of the present invention, as well as particular features and advantages thereof, will be elucidated in, or apparent from, the following description and the accompanying drawing figures.

SUMMARY OF THE INVENTION

The present invention overcomes the limitations of conventional wire stripper blades and accomplishes the above objects, among others, by providing a wire stripper blade for cutting to the center conductor of a coaxial cable, the blade having a V-notch in the circumferential periphery thereof. When the wire stripper is rotated about the cable, the corners of the V-notch cut through and sever the braid sheath and inner insulation layer of the cable, while the center conductor remains within a circle defined by the corners of the V-notch, which circle is spaced apart from and concentric with the center conductor. The use of a V-notch eliminates dragging of the braid and the possibility of one or more wire strands thereof wrapping around the center conductor. The V-notch also eliminates nicking of the center conductor which can cause poor transmission signals.

DETAILED DESCRIPTION OF THE PREFERRED EMBODIMENTS

Figure 1:
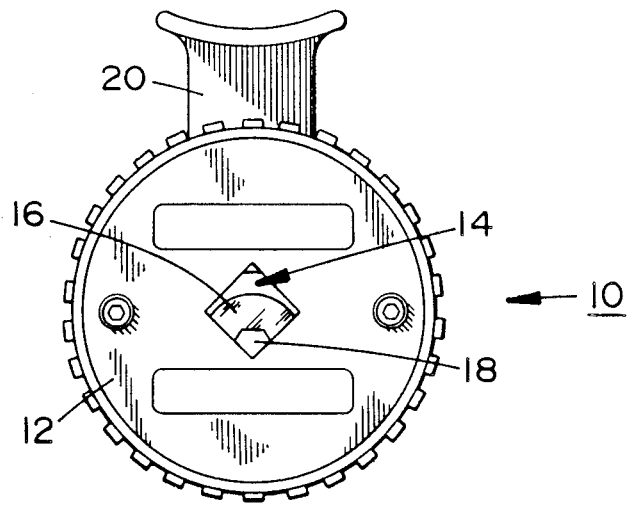
FIG. 1 is a front elevation view of a wire stripper in which the present invention may be employed.

Referring now to the Drawing, FIG. 1 is a front elevation view of a wire stripper, generally indicated by the reference numeral 10, of the type described in U.S. Pat. No. 4,805,302, which patent should be referred to for a detailed description of the construction and operation of the wire stripper. Wire stripper 10 includes a body 12 having an aperture 14 formed therethrough. A circular cutting blade 16 is mounted on a hub 18 which is part of a slide, an extension 20 of which slide extends from body 12. Depression of extension 20 causes blade 16 to clear aperture 14 so that a wire or cable (not shown) may be inserted through the aperture. Subsequent rotation of wire stripper 10 about the wire or cable causes blade 16 to cut into and sever one or more layers of the wire or cable.

Figure 2:
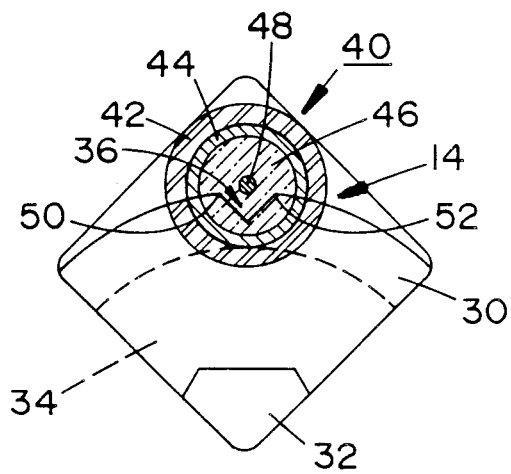
FIG. 2 is an enlarged section of the wire stripper of FIG. 1, including a cutting circular blade according to the present invention.
Figure 3:
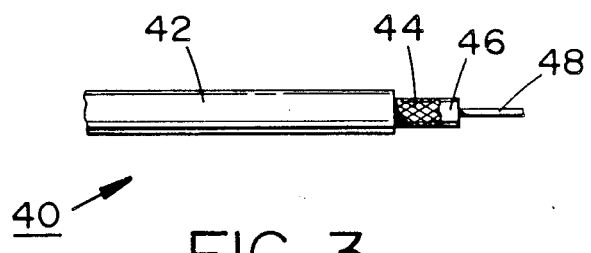
FIG. 3 is a side elevation view of a coaxial cable as might have been stripped using the wire stripper of FIG. 1 and the present invention.

FIG. 2 is an enlarged view of aperture 14 of wire stripper 10 showing a first cutting blade 30 fixedly mounted on an hexagonal hub 32 and a second cutting blade 34 mounted on a hub (not shown) coaxially with the first cutting blade. First cutting blade 30 has a V-notch 36 defined in the top thereof. A coaxial cable, generally indicated by the reference numeral 40 is shown disposed in aperture 14 and is indicated in cross-section as having been cut by first and second cutting blades 30 and 32. (Reference also to FIG. 3, which shows cable 40 after being cut and stripped, will assist in understanding the parts of the cable.) Cable 40 includes an outer insulation jacket 42, a braid layer 44, an insulation core, 46, and a center conductor 48.

Again referring to FIG. 2, second cutting blade 32 has cut through insulation jacket 42 to braid layer 44 and the corners 50 and 52 of notch 36 of first cutting blade 30 have cut through insulation core 46 toward center conductor 48 which is protected from nicking of the blade by being disposed within a circle defined by the corners of the notch during the rotation of stripper 10. It can be seen that corners 50 and 52 do not cut fully to center conductor 48 in order to allow for center conductors of varying diameters. Any uncut material of insulation core 46 is pulled off center conductor 48 when the cut material is removed. The amount of uncut material will be more or less depending on whether the diameter of center conductor 48 is lesser or greater, respectively.

As noted above, it has been found that V-notch 36 avoids the problem of braid dragging associated with conventional square cutting notches, which dragging can lead to short circuits.

Also as noted above, the present invention is applicable to straight-blade wire or cable strippers as well.

Figure 4:
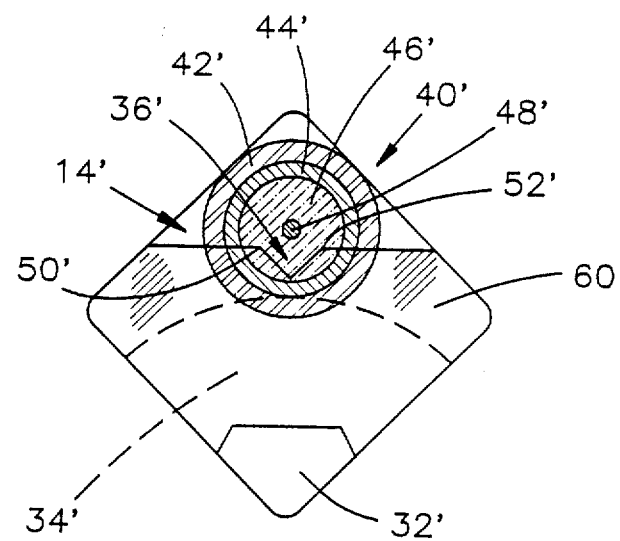
FIG. 4 is an enlarged portion of the wire stripper of FIG. 1, including a straight cutting blade according to the present invention.

FIG. 4 is similar to FIG. 2 and like elements are given primed reference numerals, the only difference being that a straight cutting blade 60 has been substituted for first cutting blade 30 of FIG. 2. The operation and advantages of the embodiment shown on FIG. 4 are identical to the embodiment shown on FIG. 2.

It will thus be seen that the objects set forth above, among those made apparent from the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A wire stripper for a wire or cable having an insulation layer and having a center conductor, comprising:
 (a) a body;
 (b) a cutting blade mounted in said body, said cutting blade having a V-notch in a cutting edge thereof, said cutting blade being so disposed that the corners thereof will cut into said wire or cable when said wire or cable is brought into cutting engagement with said cutting edge of said cutting blade; and
 (c) means to bring said cutting edge of said cutting blade into cutting engagement with said insulation layer of said wire or cable such that rotation of said wire stripper about said wire or cable will cause said corners of said V-notch to cut through said insulation layer while defining a circle spaced from and concentric with said center conductor.

2. A wire stripper, as defined in claim 1, wherein said cutting blade is circular.

3. A wire stripper, as defined in claim 1, wherein said cutting blade is straight.

* * * * *

UNITED STATES PATENT AND TRADEMARK OFFICE
CERTIFICATE OF CORRECTION

PATENT NO. : 4,985,996                 Page 1 of 2

DATED : January 22, 1991

INVENTOR(S) : Richard A. Steiner

It is certified that error appears in the above-identified patent and that said Letters Patent is hereby corrected as shown below:

The sheet of drawing consisting of Fig. 4, should be added as shown on the attached sheet.

Signed and Sealed this

Fourth Day of August, 1992

*Attest:*

DOUGLAS B. COMER

*Attesting Officer*        *Acting Commissioner of Patents and Trademarks*